(12) United States Patent
Nilson et al.

(10) Patent No.: US 9,315,648 B2
(45) Date of Patent: Apr. 19, 2016

(54) GEL PUTTIES, ARTICLES COMPRISING SAME, AND METHODS OF FORMING SUCH GEL PUTTIES AND ARTICLES

(75) Inventors: Joseph T. Nilson, Alpine, UT (US); Russell Whatcott, Eagle Mountain, UT (US)

(73) Assignee: EdiZONE, LLC, Alpine, UT (US)

( * ) Notice: Subject to any disclaimer, the term of this patent is extended or adjusted under 35 U.S.C. 154(b) by 1339 days.

(21) Appl. No.: 13/098,182

(22) Filed: Apr. 29, 2011

(65) Prior Publication Data

US 2012/0031800 A1    Feb. 9, 2012

Related U.S. Application Data

(60) Provisional application No. 61/400,829, filed on Aug. 3, 2010.

(51) Int. Cl.
| | | |
|---|---|---|
| *B65D 85/00* | (2006.01) | |
| *C08L 53/00* | (2006.01) | |
| *C08K 5/01* | (2006.01) | |
| *C08K 3/00* | (2006.01) | |

(52) U.S. Cl.
CPC ................. *C08K 5/01* (2013.01); *C08K 3/0033* (2013.01); *C08L 53/00* (2013.01)

(58) Field of Classification Search
CPC .................................. C08K 5/01; C08L 53/00
See application file for complete search history.

(56) References Cited

U.S. PATENT DOCUMENTS

| | | |
|---|---|---|
| 5,421,874 A | 6/1995 | Pearce |
| 5,549,743 A | 8/1996 | Pearce |
| 5,592,706 A | 1/1997 | Pearce |
| 5,626,657 A | 5/1997 | Pearce |
| 5,749,111 A | 5/1998 | Pearce |
| 5,829,081 A | 11/1998 | Pearce |
| 5,994,450 A | 11/1999 | Pearce |
| 6,020,055 A | 2/2000 | Pearce |
| 6,026,527 A | 2/2000 | Pearce |
| 6,197,099 B1 | 3/2001 | Pearce |
| 6,797,765 B2 | 9/2004 | Pearce |
| 7,766,963 B2 * | 8/2010 | Laghi ................................ 623/7 |

* cited by examiner

*Primary Examiner* — Robert Harlan
(74) *Attorney, Agent, or Firm* — TraskBritt

(57) ABSTRACT

A healable gel putty may comprise an elastomeric polymer and a plasticizer. The elastomeric polymer may have a melt mass-flow rate in a range extending from about 2 g/10 min to about 100 g/10 min. A weight ratio of the plasticizer to the elastomeric polymer may be from about 1-to-1 to about 50-to-1. An article of manufacture may comprise gel putty disposed in a flexible container. A method of forming gel putty may comprise forming a mixture comprising an elastomeric polymer and a plasticizer. An article of manufacture may be formed by disposing gel putty within a flexible container.

43 Claims, 4 Drawing Sheets

GEL PUTTIES, ARTICLES COMPRISING SAME, AND METHODS OF FORMING SUCH GEL PUTTIES AND ARTICLES

CROSS-REFERENCE TO RELATED APPLICATIONS

This application claims the benefit of U.S. Provisional Patent Application Ser. No. 61/400,829, filed Aug. 3, 2010, titled "Putty Comprising Healable Permanently Reshapeable Gel for Cushioning, Flotation, and Other Uses," the disclosure of which is incorporated herein by reference in its entirety. The subject matter of this application is related to the subject matter of U.S. patent application Ser. No. 14/145,737, filed Dec. 31, 2013, titled "Ultralight Flowable Materials and Articles of Manufacture Including Same," which was published as U.S. Patent Publication No. 2014/0183093 on Jul. 3, 2014.

FIELD

Embodiments of the disclosure relate generally to gel putties, to cushions and other devices including gel putties, and to methods of making and using such gel putties, cushions, and devices.

BACKGROUND

Cushioning materials may comprise gelatinous elastomers and lightweight fillers. Gelatinous elastomers may comprise an elastomeric polymer, such as an A-B-A triblock copolymer elastomer, and a plasticizer. The plasticizer may be mineral oil or another hydrocarbon fluid.

Gelatinous elastomers having A-B-A tri-block copolymers are described, for example, in U.S. Pat. No. 6,797,765, issued Sep. 28, 2004 to Pearce, and U.S. Pat. No. 5,994,450, issued Nov. 30, 1999 to Pearce, which are each incorporated herein in their entirety by this reference. Gelatinous elastomers have a variety of uses. U.S. Pat. No. 6,026,527, issued Feb. 22, 2000 to Pearce, and U.S. Pat. No. 5,749,111, issued May 12, 1998 to Pearce, which are each incorporated herein in their entirety by this reference, describe cushioning elements including gelatinous elastomers. Such gelatinous elastomers are commercially available from EdiZONE, LLC of Alpine, Utah.

Conformable cushions may be formed from cushioning materials disclosed in U.S. Pat. No. 5,421,874, issued Jun. 6, 1995 to Pearce, U.S. Pat. No. 5,549,743, issued Aug. 27, 1996 to Pearce, U.S. Pat. No. 5,626,657, issued May 6, 1997 to Pearce, and U.S. Pat. No. 6,020,055, issued Feb. 1, 2000 to Pearce, each of which is fully incorporated herein by this reference. Cushioning materials are commercially available from EdiZONE, LLC of Alpine, Utah, under the trade names FLOAM™ and Z-FLO™.

Figure 1:
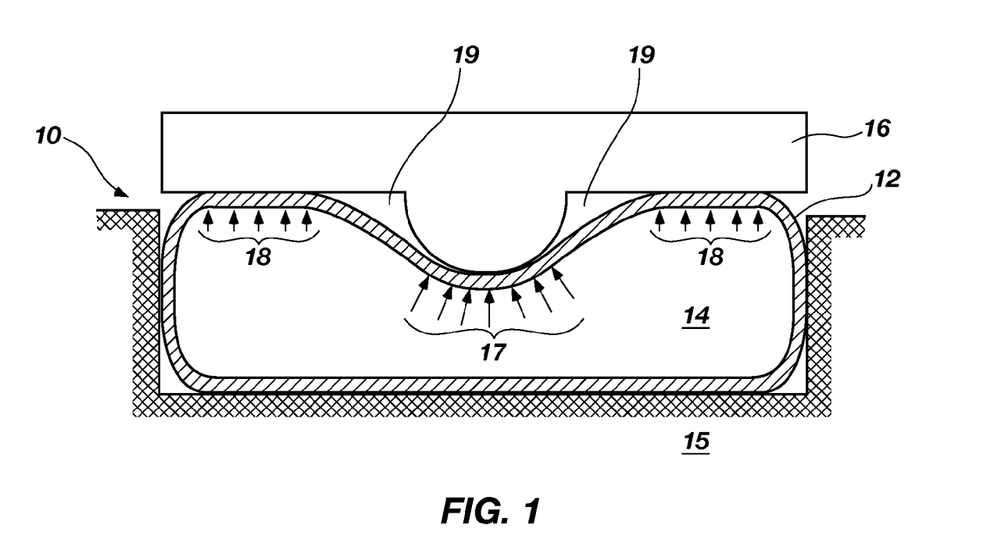
FIG. 1 is a simplified drawing illustrating a previously known cushioning device cushioning an irregularly shaped object.

FIG. 1 illustrates a cushion 10 including a bladder 12 in which a self-forming fluid cushioning material 14 known in the art and commercially available under the trade name FLOAM™ is disposed. The cushioning material 14 comprises a mixture of liquid and microspheres. The liquid comprises an oil plasticizer (about 99.25% by weight of the liquid) and a relatively small amount of an elastomeric polymer material (about 0.75% by weight of the liquid) dissolved within the oil plasticizer. The cushioning material 14 has a density of about 0.33 g/cm$^3$. The cushion 10 may be disposed within a base 15. The liquid in FLOAM™ generally has a plasticizer-to-polymer ratio by weight of greater than about 100-to-1, such as about 133-to-1.

An object or body part 16 placed upon the cushion 10 is supported along surfaces of the object or body part 16 in contact with the cushion 10. The object or body part 16 may be supported by the cushion 10 via pressures 17 and 18 (indicated by arrows in FIG. 1) over areas in which the object or body part 16 contacts the cushion 10. In areas in which the object 16 does not contact the cushion 10, the cushion 10 does not support the object or body part 16. For example, spaces or gaps 19 between the object or body part 16 and the cushion 10 result in areas of the object or body part 16 unsupported by the cushion 10. The magnitude of the pressures 17 and 18 needed to support the object 16 varies inversely with the area over which the pressures 17 and 18 apply.

BRIEF SUMMARY

In some embodiments, the present disclosure includes healable gel putty materials. The gel putty material includes an elastomeric polymer having a melt mass-flow rate in a range extending from about 2 g/10 min to about 100 g/10 min, and a plasticizer mixed with the elastomeric polymer to form the healable gel putty material. A ratio of the plasticizer to the elastomeric polymer by weight may be in a range extending from about 1-to-1 to about 50-to-1.

In additional embodiments, the present disclosure includes articles of manufacture that include a material comprising gel putty disposed within a flexible container. The gel putty includes an elastomeric polymer and a plasticizer mixed with the elastomeric polymer. The elastomeric polymer may have a melt mass-flow rate in a range extending from about 2 g/10 min to about 100 g/10 min. A ratio of the plasticizer to the elastomeric polymer by weight in the gel putty may be in a range extending from about 1-to-1 to about 50-to-1.

In yet further embodiments, the present disclosure includes methods of making such gel putties and articles of manufacture.

For example, in some embodiments, a gel putty may be formed by mixing a plasticizer and an elastomeric polymer to form a mixture, selecting the elastomeric polymer to comprise an elastomeric polymer having a melt mass-flow rate in a range extending from about 2 g/10 min to about 100 g/10 min, and formulating a ratio of the plasticizer to the elastomeric polymer by weight in the mixture to be in a range extending from about 1-to-1 to about 50-to-1.

As another example, an article of manufacture may be formed by forming gel putty, and disposing the gel putty within a flexible container. The gel putty may be formed by mixing a plasticizer and an elastomeric polymer to form a mixture, selecting the elastomeric polymer to comprise an elastomeric polymer having a melt mass-flow rate in a range extending from about 2 g/10 min to about 100 g/10 min, and formulating a ratio of the plasticizer to the elastomeric polymer by weight in the mixture to be in a range extending from about 1-to-1 to about 50-to-1.

BRIEF DESCRIPTION OF THE DRAWINGS

While the specification concludes with claims particularly pointing out and distinctly claiming that which are regarded as embodiments of the present disclosure, various features and advantages of this disclosure may be more readily ascertained from the following description of example embodiments of the disclosure provided with reference to the accompanying drawings, in which:

DETAILED DESCRIPTION

As used herein, the term "gel putty" means and includes a mixture of an elastomeric polymer and a plasticizer, a volume of which may be rejoined and healed after being parted. As used herein, "healing" means and includes becoming a unified or integrated mass. Two portions of gel putty that are placed adjacent one another may become a single mass, and the boundary between the two portions may become obscured. When a force is applied on the single mass, the mass may part in a different location than the boundary between the original two portions.

As used herein, the term "solid gel putty" means and includes any gel putty that will not run or flow like liquid in the absence of any applied force other than the gravitational force, but that is not rigid and will deform and/or part under an applied force or pressure in excess of the gravitational force.

As used herein, the term "liquid gel putty" means and includes any gel putty that will run or flow like a liquid due to the gravitational force. Liquid gel putties may be viscoelastic in nature.

As used herein, the term "elastomeric polymer" means and includes a polymer capable of returning to its original shape after deformation. In other words, an elastomeric polymer is a polymer having elastic properties. Elastomeric polymers may also be referred to as "elastomers" in the art. Elastomeric polymers include homopolymers (polymers having a single chemical unit repeated) and copolymers (polymers having two or more chemical units). Elastomeric polymers may have a linear or ring architecture. The polymer backbone may or may not be branched.

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility or softness of the material. Plasticizers include hydrocarbon fluids, such as mineral oils. Hydrocarbon plasticizers may be aromatic or aliphatic.

As used herein, the term "gelatinous elastomer" means and includes a mixture of an elastomeric polymer and a plasticizer that when deformed in compression comes back to its original shape, that under tension can be stretched to many times its original size but still comes back to its original size and shape, that is rubbery in feel but can deform to the shape of an object applying a deforming pressure better than typical rubber materials, and that has a durometer hardness lower than typical rubber materials. For example, gelatinous elastomers have a Shore A durometer hardness of less than 1 up to about 50, whereas typical rubber materials have a Shore A durometer hardness of from about 55 to 100. The term "elastomeric gel" may be used synonymously with "gelatinous elastomer" in the art.

As used herein, the term "plasticizer-to-polymer ratio" means and includes the ratio of the weight of plasticizer to the weight of polymer (e.g., elastomeric polymer) in a material. For example, a material comprising 80% plasticizer and 20% elastomeric polymer has a plasticizer-to-polymer ratio of 4.

As used herein, the term "flexible container" means and includes a material that can adapt under pressure to the shape of an object in contact therewith and is capable of retaining another material. Flexible containers may include sewn or woven fabrics, plastics such as thermally welded plastic films, which may include polyurethane, polyethylene or polyvinyl chloride, or another material that is flexible. Flexible containers may define an enclosed volume (e.g., a bladder) or may retain another material by virtue of attachment thereto (e.g. a stitched, sewn, or quilted sheet).

As used herein, the term "cushion" means and includes any deformable device that is intended for use in cushioning one body relative to another. As a non-limiting example, cushions include cushions intended for use in cushioning the body of a person relative to another object that might otherwise abut against the body of the person.

As used herein, the phrase "melt mass-flow rate" (MFR) means a melt mass-flow rate as determined according to ISO 1133 (Plastics—Determination of the Melt Mass-Flow Rate (MFR) and the Melt Volume-Flow Rate (MVR) of Thermoplastics, International Organization for Standardization, Geneva, Switzerland, 2005) when tested at 230° C. with a 2.16 kg mass.

The illustrations presented herein are not actual views of any particular material or device, but are merely idealized representations employed to describe embodiments of the present disclosure. Elements common between figures may retain the same numerical designation.

Gel putties are described herein. Gel putty may include an elastomeric polymer and a plasticizer, and a weight ratio of the plasticizer to the elastomeric polymer may be from about 1 to about 50. The elastomeric polymer may have a melt mass-flow rate in a range extending from about 2 g/10 min to about 100 g/10 min. Gel putties may be used as a cushioning material, or in a cushioning material comprising gel putty and filler material. Articles of manufacture, such as cushions and toys, may comprise gel putties disposed in flexible containers. The gel putties may be liquid gel putties or solid gel putties.

It has been unexpectedly discovered that some particular combinations of elastomeric polymers and plasticizers do not form gelatinous elastomers, but instead form gel putties. Gel putties may have widely varying properties depending on the properties of the elastomeric polymer and the plasticizer therein, the plasticizer-to-polymer ratio, other ingredients, etc. Gel putties may have semi-rubbery or elastic properties but do not return fully to shape when deforming forces are removed. Gel putties having higher plasticizer-to-polymer ratios may exhibit properties more like those of viscoelastic fluid-like materials (i.e., time-dependent strain) than gel putties having lower plasticizer-to-polymer ratios.

A gel putty may partially or completely reshape to match the shape of an object in contact with the gel putty. A gel putty may have a low spring-back pressure acting on an object in contact with the gel putty when the gel putty is deformed from its original shape (i.e., the magnitude of the force exerted by the gel putty may not be proportional to the amount of deformation of the gel putty). Spring-back pressure is common to fully elastic materials because elastic materials exert a force opposite the direction of deformation. Since gel putties may be parted or separated by a deforming load, they may not exert spring-back pressure at all, or the spring-back pressure may be small. In other words, cleavage of a gel putty material may decrease the tendency for the material to return to its original shape. However, separated portions of gel putty material may still heal to again form a unified mass when again placed in contact with one another. Thus, a gel putty material may be split and rejoined, and once rejoined, may have properties as though it were never split. Gel putties may not be permanently broken in use since they are healable. Gelatinous elastomers, in contrast, do not generally heal once broken, even when rejoined.

A gel putty may be formed by mixing an elastomeric polymer with a plasticizer. Elastomeric polymers for use in gel putties may have densities from about 0.7 g/cm$^3$ to about 1.2 g/cm$^3$. For example, an elastomeric polymer in some embodiments may have a density from about 0.8 g/cm$^3$ to about 1.0 g/cm$^3$, or more particularly, about 0.9 g/cm$^3$. The elastomeric polymer may have a melt mass-flow rate (MFR) in a range extending from about 2 g/10 min to about 100 g/10 min. For example, an elastomeric polymer in some embodiments may have an MFR from about 2 g/10 min to about 70 g/10 min. The elastomeric polymer may have a tensile strength at yield, as determined according to ISO 37 (Rubber, Vulcanized or Thermoplastic—Determination of Tensile Stress—Strain Properties, International Organization for Standardization, Geneva, Switzerland, 2005) or ASTM Standard D412 (Standard Test Methods for Vulcanized Rubber and Thermoplastic Elastomers, ASTM Intl, West Conshohocken, Pa., 2006), from about 1 MPa (145 psi) to about 30 MPa (4350 psi). For example, an elastomeric polymer in some embodiments may have a tensile strength at yield from about 5 MPa (725 psi) to about 20 MPa (2900 psi). The elastomeric polymer may have a tensile elongation at break, tested according to ISO 37, from about 200% to about 1000%. For example, an elastomeric polymer in some embodiments may have a tensile elongation at break from about 400% to about 800%. In some embodiments, the elastomeric polymer may have a styrene (e.g., polystyrene) content from about 10 wt % to about 70 wt %, or from about 10 wt % to about 40 wt %. In further embodiments, elastomeric polymers may have a styrene content from about 20 wt % to about 30 wt %.

Gel putties may comprise one or more or elastomeric polymers. For example, gel putties may comprise elastomeric block copolymers such as triblock copolymers, diblock copolymers, branched copolymers (e.g., star copolymers), etc. Gel putties may comprise A-B-A triblock copolymers such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under trade name SEPTON® 2002, and from Kraton Polymers, LLC, of Houston, Tex., under the trade names KRATON® G1643M and KRATON® MD6945M. In these examples, the "A" blocks are styrene. Gel putties may comprise elastomeric polymers other than styrene-based copolymers, such as elastomeric polymers that are thermoplastic in nature or that can be solvated by plasticizers.

"A" blocks of triblock copolymers are connected to other "A" blocks via the "B" blocks of the copolymer. "A" blocks of diblock copolymers are connected to "B" blocks. Because of the lack of connections through "B" blocks to other "A" blocks, diblock copolymers (even those with higher average molecular weight [MW]) may form gel putties with lower plasticizer percentages than do triblock copolymers, and may maintain a partially elastic nature even though shapeable and healable.

Gel putties may comprise one or more plasticizers. Without being bound to a particular theory, it is believed that plasticizers coat elastomeric polymers, allowing coated elastomeric polymers to slide past one another more easily than uncoated elastomeric polymers. Gel putties may comprise hydrocarbon fluids, such as mineral oils. For example, gel putties may comprise aromatic-free food-grade white paraffinic mineral oils, such as those sold by Sonneborn, Inc., of Mahwah, N.J., under the trade names BLANDOL® and CARNATION®.

In some embodiments, gel putties may have plasticizer-to-polymer ratios from about 1-to-1 to about 50-to-1 by weight. For example, gel putties may have plasticizer-to-polymer ratios from about 2-to-1 to about 30-to-1 by weight, or even from about 15-to-1 to about 25-to-1 by weight. In further embodiments, gel putties may have plasticizer-to-polymer ratios of about 20-to-1 by weight. Relatively higher ratios may result in the formation of liquid gel putties, whereas relatively lower ratios may result in the formation of solid gel putties.

Gel putties may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl)propionate), commercially available as IRGANOX® 1010, from BASF Corp., of Iselin, N.J., and tris(2,4-ditert-butylphenyl)phosphate, commercially available as IRGAPHOS® 168, from BASF Corp. One or more antioxidants may be combined in a single gel putty formulation. The use of antioxidants in mixtures of plasticizers and polymers is described in columns 25-26 of U.S. Pat. No. 5,994,450 to Pearce, dated Nov. 30, 1999, previously incorporated by reference. Gel putty formulations may comprise up to about 5 wt % antioxidants. For instance, a gel putty may comprise about 0.10 wt % to about 1.0% antioxidants.

Gel putties may be smooth and may coat surfaces evenly, even at high concentrations of polymer (e.g., plasticizer-to-polymer ratios of from about 5-to-1 to about 25-to-1). In contrast, conventional gelatinous elastomers may not coat surfaces evenly without lumps or striations even at very low concentrations of polymer (e.g., at a plasticizer-to-polymer ratios of about 100-to-1). Coatings of conventional gelatinous elastomers on surfaces may be striated or lumpy. For example, coatings of conventional gelatinous elastomers on filler particles may not provide sufficient lubrication to allow filler particles to smoothly flow past one another.

A cushioning material comprising gel putty contained within a flexible container may exhibit beneficial cushioning properties, such as or better than those cushioning properties exhibited by gelatinous elastomers or by fluids within flexible containers (e.g., waterbed mattresses). For example, in a flexible container that can adapt under pressure to the shape of an object or body part, a gel putty may absorb shocks and vibrations, such as when a load acting on the flexible container changes magnitude, direction, or area of application. A flexible container filled with a cushioning material comprising gel putty may, like fluid-filled flexible containers, change shape in response to changes in the load. Such gel putty cushioning materials may exert an approximately uniform pressure on all or a majority of the interior surfaces of a flexible container in which the cushioning material is contained. In some embodiments, a cushioning material may conform closely to irregularities of an object or body part, such that the pressure exerted by the cushioning material on the object or body part is substantially uniform across the contact surface. In other words, a cushioning material that conforms to an object or body part may support the object or body part uniformly, without areas of extreme pressure. Furthermore, since the weight or force of the supported object or body is spread over a larger area, the average pressure exerted over the area of contact is lower.

Figure 2:
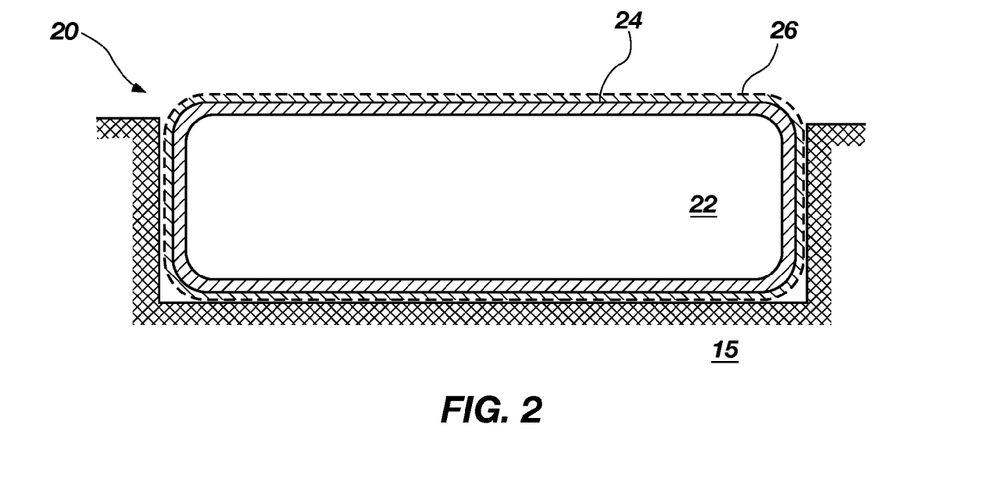
FIG. 2 is a simplified drawing illustrating an embodiment of a cushioning device of the present disclosure.
Figure 3:
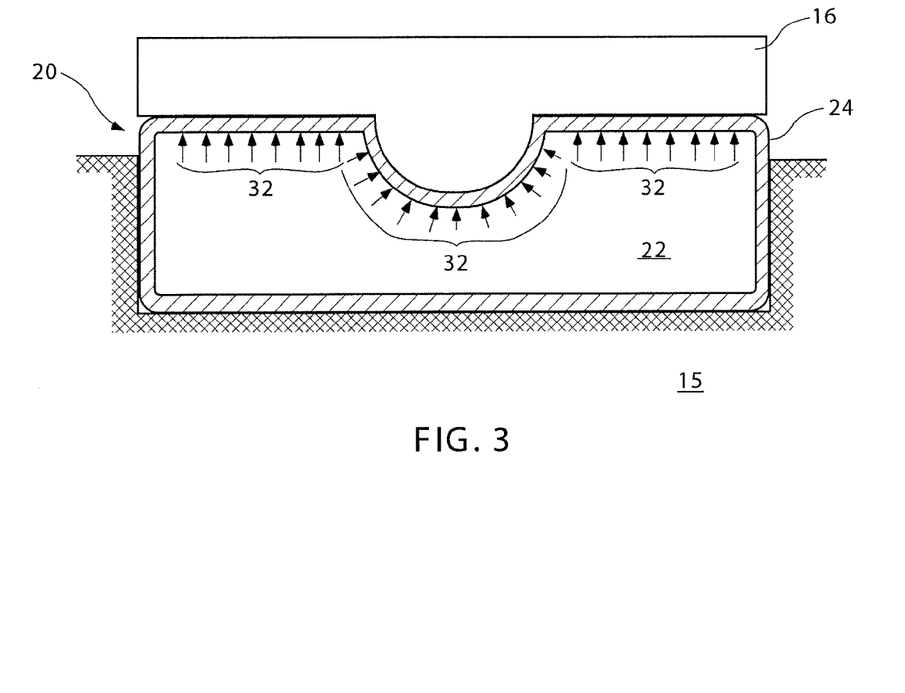
FIGS. 3 through 5 are simplified drawings illustrating embodiments of cushioning devices of the present disclosure cushioning irregularly shaped objects.

As shown in FIG. 2, a cushion 20 may comprise a cushioning material 22 disposed in a flexible container 24. The cushion 20 may have an optional cover 26 and may be disposed within a base 15. As shown in FIG. 3, when an object or body part 16 is placed upon or against the cushion 20, the cushioning material 22, flexible container 24 (i.e., a bladder), and optional cover 26 (not shown in FIG. 3) may deform to correspond to the contours of the object or body part 16. The cushioning material 22 may exert low spring-back pressure (i.e., the cushioning material 22 may have a lower force opposite the direction of its deformation than does a conventional cushioning material). Therefore, a pressure 32 of the cushion 20 on the object or body part 16 may be approximately constant across the surface of the object or body part 16 in contact with the cushion 20. Furthermore, because the pressure 32 acts over a larger area than the pressures 17 and 18 shown in FIG. 1, the magnitude of the pressure 32 supporting the object or body part 16 with cushion 20 is less than the magnitude of the pressure 17 supporting the same object or body part 16 with a conventional cushion 10.

The flexible container 24 may comprise any flexible material, such as fabric or plastic. The flexible container 24 may comprise a porous or nonporous material. Flexible containers 24 comprising fabric may be less expensive than flexible containers 24 comprising plastic, and may have a more natural or comfortable feel for human and animal users than plastic. The flexible container 24 may confine the cushioning material 22 (i.e., may tend to conform the cushioning material 22 to the shape of the flexible container 24 as the flexible container 24 changes its shape). If the flexible container 24 comprises a porous material, the cushioning material 22 may comprise a relatively low percentage of plasticizer and may be "dry" enough that the plasticizer cannot seep into or through pores or seams of the fabric. In other words, a cushioning material 22 comprising a gel putty with a sufficiently low plasticizer-to-polymer ratio may be confined within or along a flexible container 24 comprising a porous material without any of the plasticizer of the gel putty seeping into or through the pores or seams of the flexible container 24. Flexible containers 24 comprising fabrics of finer weave or knit may confine cushioning materials 22 comprising gel putties having higher plasticizer-to-polymer ratios better than flexible containers 24 comprising fabrics of coarser weave or knit. Knit fabrics may adapt better under pressure to the shape of an object or body part than woven fabrics.

In some embodiments, cushioning materials 22 may be confined within or along a nonporous material, for example, in a flexible container 24 made from a polymer film, such as thermoplastic polyurethane, a gelatinous elastomer, or other elastomeric or pliable material. Flexible containers 24 may be of any selected thickness, for example, from 0.051 mm (0.002 in) thick to 7.62 mm (0.300 in) thick. Thicker films of a given material may be stronger than thinner films of that material, but may have lower "hand" (i.e., ability to deform around irregularities of a cushioned object or body part 16). For example, if the flexible container 24 comprises a polyurethane film, the average thickness of the polyurethane film may be between about 0.051 mm (0.002 in) and about 0.305 mm (0.012 in). If the flexible container 24 comprises a gelatinous elastomers, the average thickness of the gelatinous elastomer film may be between about 0.51 mm (0.020 in) and about 7.62 mm (0.300 in). Non-limiting general examples describing the use of fluid containers for cushioning are described in U.S. Pat. No. 5,592,706, issued Jan. 14, 1997 to Pearce, which is incorporated herein in its entirety by reference.

An optional cover 26 may be disposed over or around the container 24, as shown in FIG. 2. For example, a fabric cover 26 may cover a nonporous container 24 (e.g., a thermoplastic polyurethane film flexible container 24 having a cushioning material 22 sealed inside it). The optional cover 26 may be permanently affixed to the container 24, or may be removable. Though not shown in FIG. 3 or subsequent figures, any of the cushions 20 described herein may comprise optional covers 26.

Cushioning materials 22 may comprise gel putty, and optionally, a filler. For example, cushioning materials 22 may comprise particles such as microspheres (i.e., approximately spherical particles having a mean diameter of less than about 1,000 microns). Fillers may be solid and may or may not contain voids. Such voids may be filled with gases, liquids, phase change materials or any other substance. Fillers may be spherical or any other appropriate shape. Fillers may include, for example, talc, silica (e.g., fumed silica), hollow or solid microspheres, or pearlite. Cushioning materials 22 comprising fillers may exhibit different properties (e.g., density, viscosity, stiffness, shrinkage, thermal conductivity, heat capacity, etc.) than cushioning materials not comprising fillers. Cushioning materials 22 may exhibit different pressure relief and shear relief properties. Properties may vary based on the quantity and type of fillers. A given mass or volume of cushioning material 22 comprising fillers may cost less than an equivalent mass or volume of cushioning material 22 not comprising fillers. Fillers may have densities, for example, of 3 g/cm$^3$ or lower, about 1 g/cm$^3$ or lower, about 0.5 g/cm$^3$ or lower, about 0.2 g/cm$^3$ or lower, or even about 0.1 g/cm$^3$ or lower. For example, fillers may have a density of about 0.015 g/cm$^3$, such as the ultra-light hollow acrylic microspheres currently available from Eka Chemicals AB, of Sundsvall, Sweden, under the trade name EXPANCEL®. Cushioning materials 22 may comprise up to about 90 wt % fillers. For instance, a cushioning material 22 may include about 1 wt % to about 50% filler, or from about 20 wt % to about 33 wt % filler. A cushioning material 22 comprising a larger percentage of filler that is lower density than the gel putty without that filler may have a lower density than a cushioning material 22 comprising a smaller percentage of filler.

The cushion 20 shown in FIG. 2 may be disposed on or within a base 15. For example, the base 15 may comprise a seat support, such as wheelchair or office chair. The base 15 may define an open cavity in which the cushion 20 may fit. In embodiments in which a cushion 20 is placed within an open cavity, a wall of the cavity may support at least a portion of the cushion 20 disposed therein. The base 15 may comprise a material that is more rigid than the cushion 20, such as a firm polyethylene foam.

Figure 4:
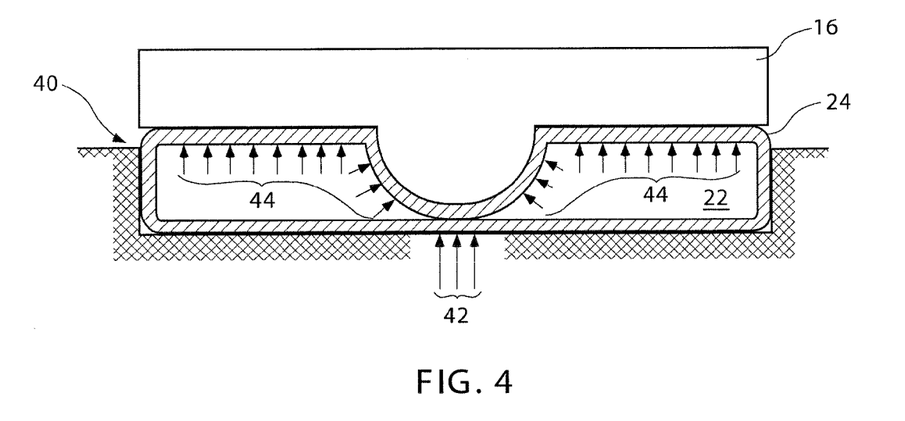

The amount of cushioning material 22 placed within a flexible container 24 may be selected such that an object or body part 16 may deform the flexible container 24 to conform with the shape of the cushioned object or body part 16. The flexible container 24 may tension (or "hammock") after conforming to the shape of the object or body part 16 before the cushioned object or body part 16 "bottoms out" (see FIG. 3). As shown in FIG. 4, a cushion 40 with an underfilled flexible container 24 deforms to correspond with the contours of the object or body part 16, but the object or body part 16 bottoms out by pushing at least a portion of opposing sides of the flexible container 24 together. If the object or body part 16 bottoms out, it may not be supported entirely by the cushion 40, but may be at least partially supported by a surface of the base 15 against which the cushion 40 rests. An underfilled cushion 40 may not provide adequate support for the object or body part 16 because the object or body part 16 may be resting against the base 15. Thus, there may be areas of higher pressure 42 corresponding with areas of the object or body part 16 unsupported by the cushion 40. Furthermore, since the cushioning material 22 exerts low spring-back pressure, and because the cushioning material 22 has additional space in which it may deform, the pressure 44 of the cushioning material 22 on a bottomed-out object or body part 16 may be minimal.

Figure 5:
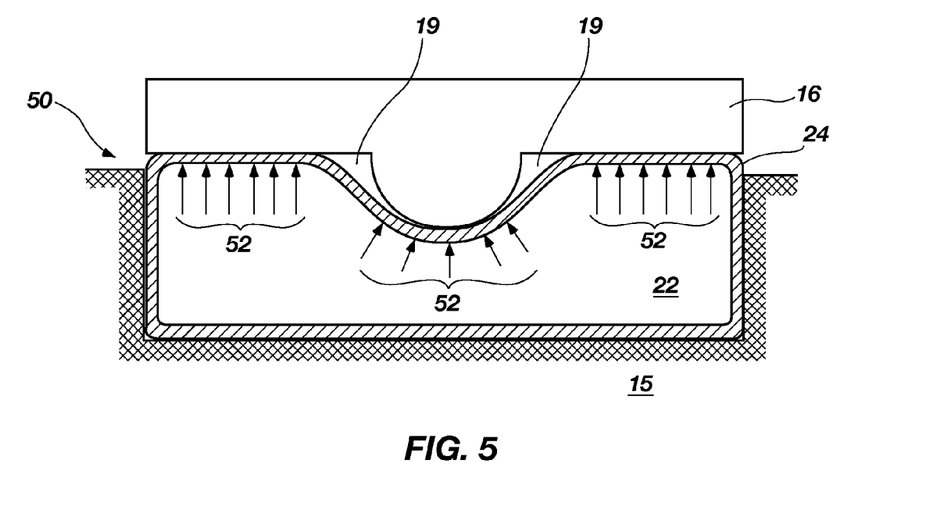

As shown in FIG. 5, an overfilled cushion 50 may hammock before conforming to the shape of the cushioned object or body part 16. As a result, there may be spaces or gaps 19 between the overfilled cushion 50 and areas of the object or body part 16 that are unsupported by the overfilled cushion 50. Because the overfilled cushion 50 provides support over a smaller contact area, the pressure 52 on the supported object or body part 16 may be higher than in a properly filled cushion (i.e., a cushion 20 that hammocks after conforming to the shape of the object or body part 16, as shown in FIG. 3).

A person having ordinary skill in the art will recognize that a proper amount of cushioning material 22 needed to form a cushion 20 may depend on the shape, size, and weight of the object or body part 16 to be cushioned. The proper amount of cushioning material 22 may also depend on the size, shape, and properties (e.g., thickness, stiffness, etc.) of the flexible container 24. Furthermore, an appropriate amount of cushioning material 22 may vary based on the properties of the cushioning material 22 itself. A cushion 20 that is properly filled for one application may be underfilled for another application and overfilled for yet another application.

Cushioning materials 22 of the present disclosure, comprising gel putty and a filler, tend to conform more fully to the irregularities of a complex cushioned object or body part 16, as illustrated in FIG. 3, than previously known cushioning materials comprising the same amount of the same filler (see FIG. 1). The reason for this is not fully understood, and the improvements have been unexpectedly discovered through experimentation. Without being bound to a particular theory, it is currently believed that the elastomeric polymers in gel putties may be mixed with plasticizers at higher polymer weight concentrations (i.e., at lower plasticizer-to-polymer ratios) than the elastomeric polymers conventionally used in self-molding fluid foam cushioning material 14 (FIG. 1). Without being bound to a particular theory, it is currently believed that the higher concentration of elastomeric polymer in embodiments of cushioning material 22 of the disclosure allows the gel putty to cling more evenly onto the entire exterior surface of each particle of the filler (e.g., each microsphere), thus improving the ability of the gel cushioning material 22 to conform to the shape of a cushioned body (see FIG. 3).

Cushioning materials comprising gel putties and fillers may provide more uniform cushioning than previously known similar cushioning materials. In the conventional cushion 10 shown in FIG. 1, cushioning material 14 may comprise a given amount of filler material and a given amount of a cushioning material. Pressures 17 and 18 supporting an object or body part 16 may be unequal, and pressure 17 may be much greater than pressure 18. The cushion 20 may support the object or body part 16 with a more uniform pressure 32. This may true even if the flexible container 24 is the same container as the bladder 12 in conventional cushion 10, the cushioned object is the same as shown in FIG. 1, and the fill level (percentage of maximum fill volume) is the same as conventional cushion 10. In other words, the benefit to conformability and flow may be attributable to the material inside the flexible container 24. In particular, the benefits may be attributable to the gel putty.

Figure 6:
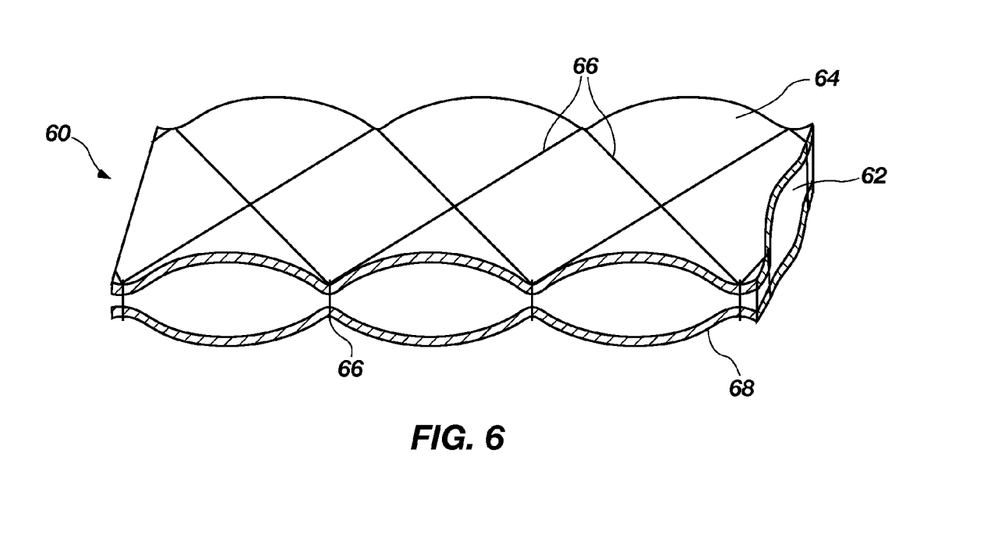
FIGS. 6 and 7 are simplified drawings illustrating objects that may be formed of the cushioning materials described herein.

In certain embodiments shown in FIG. 6, a cushion 60 may comprise a cushioning material 62 and a flexible container 64. The cushioning material 62 and flexible container 64 may comprise sheets, and may be quilted together, for example, by fibers 66. For example, the cushioning material 62 may comprise an extruded sheet of cushioning material. The cushion 60 may optionally comprise another flexible container 68 on an opposite side of the cushioning material 62 from the flexible container 64. The flexible containers 64 and 68 may comprise the same material or different materials.

Figure 7:
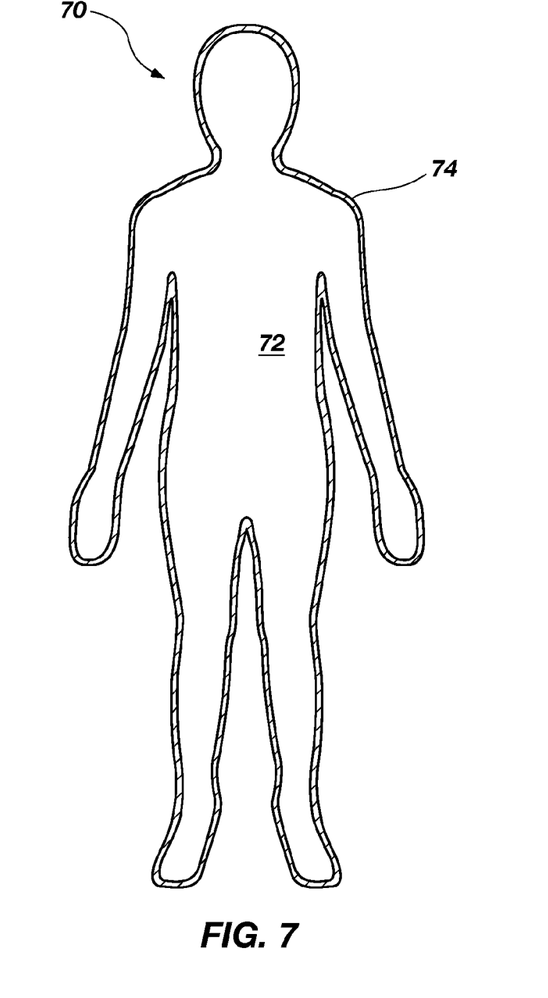

Toys may comprise a gel putty of the present disclosure. For example, as shown in FIG. 7, a doll 70 may comprise a cushioning material 72 disposed within a flexible container 74. The cushioning material 72 may comprise a gel putty and, optionally, a filler. The cushioning material 72 may comprise gel putty and fillers as described above with respect to cushioning material 22 in FIG. 2. The flexible container 74 may comprise any flexible material, as described above with respect to flexible container 24 in FIG. 2. For example, the flexible container 74 may be shaped like a human, an animal, or an imaginary character (e.g., an extraterrestrial being). The flexible container 74 may comprise arms, legs, or other body parts.

Figure 8:
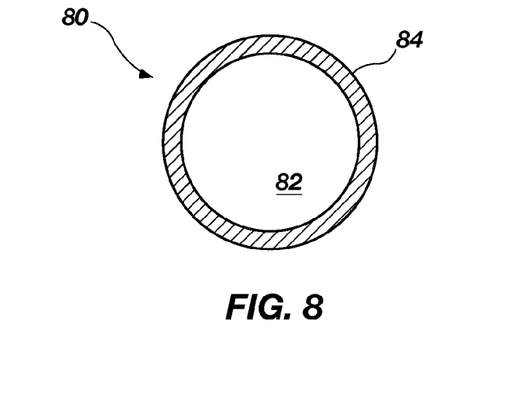
FIG. 8 is cross-sectional view of a hollow ball that includes a cushioning material as disclosed herein disposed within a flexible container.

As shown in FIG. 8, a ball 80 may comprise a cushioning material 82 disposed within a flexible container 84. The cushioning material 82 may comprise a gel putty and, optionally, a filler. The cushioning material 82 may comprise gel putty and fillers as described above with respect to cushioning material 22 in FIG. 2. The flexible container 84 may comprise any flexible material, as described above with respect to flexible container 24 in FIG. 2. For example, the flexible container 84 may be spherical when relaxed, and may be stretchable and pliable.

To form a gel putty, an elastomeric polymer may be combined with an amount of plasticizer. The elastomeric polymer and plasticizer may be mixed by any means through which heat and agitation or shearing may be applied. For example, the elastomeric polymer and the plasticizer may be mixed in a heated stirring pot or a heated extrusion screw. In some embodiments, the agitation or shearing may provide energy to heat the materials as mixing occurs (i.e., a separate heat source may not be necessary).

Sufficient plasticizer may be added to the elastomeric polymer to convert the elastomeric polymer to a gel putty. The amount of plasticizer added may be less than an amount that would convert the elastomeric polymer to a non-viscoelastic liquid (i.e., having properties generally similar to the plasticizer). Some elastomeric polymers form gelatinous elastomers (i.e., elastomers that return to their original shape after deformation and do not heal after being parted) when combined with a plasticizer. Such elastomeric polymers may form gel putties upon addition of more plasticizer, or upon addition of a different type of plasticizer. For example, some elastomeric polymers may form gel putties upon addition of a mineral oil with aromatic content. Others may form gel putties upon addition of aromatic-free food-grade white paraffinic mineral oil. Without being bound to a particular theory, it is believed that elastomeric polymers with relatively low average molecular weights (MW) may require lower concentrations of plasticizer to form gel putties. For example, the SEPS triblock copolymer sold by Kuraray America, Inc., under the trade name SEPTON® 2002, may be capable of forming a gel putty, but the SEPS triblock copolymer sold by Kuraray under the trade name SEPTON® 2006 may not be capable of forming a gel putty. Though the average molecular weights of these SEPS triblock copolymers are proprietary, the supplier indicates that SEPTON® 2006 has a higher MW than SEPTON® 2002. A gel putty formed from an elastomeric polymer with a low MW may have more elasticity because it may have a higher total weight percentage of the elastomeric polymer than a gel putty formed from an elastomeric polymer with a higher MW. Furthermore, polymers having a higher molecular weight (e.g., SEPTON® 2006) may form a strong and highly extensible gel that returns to its original shape after substantial deformation, even when plasticized with an amount of plasticizer that would be sufficient to produce a healable and reshapeable gel putty in combination with a lower molecular weight polymer (e.g., SEPTON® 2002).

To form an object comprising a gel putty, a flexible container 24, 64, 68, 74, or 84 may be formed of, for example, a fabric or plastic. For example, a sheet of material may be folded over itself and sealed along one or more edges to form flexible container 24, 74, or 84. For example, an edge of a plastic sheet may be sealed by heat, radio-frequency welding, etc. An edge of a fabric sheet may be sealed by stitching with a thread. A portion of an edge may remain unsealed to allow access to the interior of the flexible container 24, 74, or 84. The unsealed portion may comprise a neck or port.

A cushioning material 22, 62, 72, or 82 may be formed from a gel putty, as described above, and optionally, a filler. The filler may be combined with the gel putty in the same mixing apparatus or in a different mixing apparatus as that used to form the gel putty. Though adding the filler is described herein as a separate step, the filler, elastomeric polymer, and plasticizer (as well as any other ingredients of the gel putty) may be combined and mixed simultaneously.

To form a cushion 60 in which the flexible container is stitched, sewn, or quilted to the cushioning material 62, a sheet of cushioning material 62 may be formed, such as by extruding the cushioning material 62 through a die. A flexible container 64 (e.g., a sheet of stretchable fabric or plastic) and another flexible container 68, may be stitched, sewn, or quilted to the sheet of cushioning material 62, as shown in FIG. 6. The flexible container 64 and flexible container 68 may retain the cushioning material 62 and tend to conform the cushioning material 62 to the shape of the flexible container 64.

Cushioning materials comprising gel putty may provide better lateral support of a cushioned object or body part (i.e., firmer but somewhat elastically cushioned), than conventional cushioning materials. Such lateral support may be important, for example, for trunk support of a paraplegic wheelchair cushion user when he or she is reaching to the side of the wheelchair.

Cushioning materials comprising gel putty may exhibit a combination of shock absorption and lower, uniform pressure supporting cushioned objects. This combination may be beneficial in a variety of applications, such as in the protection of fragile devices (e.g., in shipping), in human comfort (e.g., seat cushions, shoe inserts, etc.). Reduction of peak pressure may help humans or animals to avoid decubitus ulcers. (Also known as bed sores or pressure sores, decubitus ulcers may form when a body part is improperly cushioned for a period of time.)

Cushioning materials 22 comprising gel putty may show improvements in conformability and flow in comparison with cushioning materials 14 comprising previously known materials, such as FLOAM™. As a result, a greater portion of the surface area of a cushioned object or body part 16 may bear on a cushion 20 having a cushioning material 22 comprising gel putty than on a cushion 10 having a cushioning material 14 comprising FLOAM™. This greater contact surface area reduces the overall average cushioning pressure and may also reduce the peak pressure, without reducing the stability of an object or body part 16 on a cushion 20.

The following examples serve to explain embodiments of the disclosure in more detail. These examples are not to be construed as being exhaustive or exclusive as to the scope of the invention.

EXAMPLES

The various materials used in the examples below may be purchased from commercial sources as indicated, such as Kuraray America, Inc. (Houston, Tex.), Sonneborn, Inc. (Mahwah, N.J.), Kraton Polymers, LLC (Houston, Tex.), BASF Corp. (Iselin, N.J.), or Eka Chemicals AB (Sundsvall, Sweden).

Example 1

A wheelchair cushion of styrene ethylene propylene styrene (SEPS) copolymer with mineral oil may be formed as follows. An A-B-A triblock copolymer of styrene ethylene propylene styrene (SEPS) having a relatively low average molecular weight is selected having a melt mass-flow rate (MFR) of about 70g/10 min, as tested according to ISO 1133 at 230° C. with a 2.16 kg mass. The triblock copolymer has a density of about 0.908 g/cm$^3$, a tensile strength at yield of about 11.2 MPa (1620 psi), and a tensile elongation at break of about 480% (the latter two as tested according to ISO 37). For example, the A-B-A triblock copolymer may comprise SEPTON® 2002, available from Kuraray America, Inc.

SEPTON® 2002 may not form a gelatinous elastomer when plasticized with a plasticizer such as mineral oil. Rather, it may form a gel putty having some elasticity, but that does not return to its original shape after substantial deformation. However, a gel putty formed from SEPTON® 2002 may heal after being parted and rejoined.

A white paraffinic food-grade mineral oil is selected having a Saybolt Universal Second (SUS) kinematic viscosity of 90 at 37.8° C. and a specific gravity at 25° C. of about 0.849 as tested by ASTM test method D4052 (Standard Test Method for Density, Relative Density, and API Gravity of Liquids by Digital Density Meter, ASTM Int'l, West Conshohocken, Pa., 1996). For example, the mineral oil may comprise BLANDOL® White Mineral Oil, available from Sonneborn, Inc.

Four parts of the mineral oil are melt blended with one part of the SEPS triblock copolymer to form a cushioning material by any means that combine heat (e.g., heating the material to 167° C. or 300° F.) and agitation or shearing (e.g., a heated stirring pot or a heated extrusion screw). The cushioning material is pumped through the neck of a thermoplastic polyurethane film into a flexible container having a thickness of 0.15 mm (0.006 in.). Air is removed from the flexible container, the neck of the flexible container is sealed, and the cushioning material is cooled to room temperature. The flexible container is placed into an open cavity of a wheelchair cushion base. The wheelchair cushion base is made of semi-rigid polyurethane foam, by molding in a closed mold with a cavity in the mold shaped to form that wheelchair cushion base. The flexible container is placed in such a manner that the sacrum, coccyx, and ischial tuberosities of the wheelchair user bear on this flexible container. The flexible container may reshape to the general shape of the user in those critical areas of his or her posterior, before the flexible container hammocks. The user does not bottom out onto the molded foam base. The flexible container provides a surface area in contact with the user that is larger than a contact surface of a conventional cushion of similar dimensions, and the pressure over this critical area tends toward equalization without substantial pressure peaks.

Example 2

A wheelchair cushion of SEPS copolymer with mineral oil is formed as follows. An A-B-A SEPS triblock copolymer is selected as described in Example 1. A white paraffinic mineral oil having a Saybolt Universal Second (SUS) kinematic viscosity of 70 at 37.8° C. is selected as the plasticizer. For example, the plasticizer may be CARNATION® White Mineral Oil, available from Sonneborn, Inc. Four parts of the mineral oil are melt blended with one part of the SEPS triblock copolymer to form a cushioning material. The cushioning material is encased in a polyurethane flexible container, and the flexible container is disposed in a wheelchair cushion base, as described in Example 1. The flexible container increases the surface area of the user that is in contact with the cushion, and the pressure over this critical area tends toward equalization without substantial pressure peaks.

Example 3

A wheelchair cushion of SEPS copolymer with mineral oil in a knit flexible container is formed as follows. An A-B-A SEPS triblock copolymer and a white paraffinic food-grade mineral oil are selected as described in Example 1. Five parts of the mineral oil are melt blended with two parts of the SEPS triblock copolymer to form a cushioning material comprising gel putty. The cushioning material is cooled to room temperature, and pumped through the neck of a tightly knit spandex (i.e., elastane) fabric flexible container. The neck of the flexible container is sewn to seal the cushioning material inside. The flexible container is placed into an open cavity of a wheelchair cushion base as described in Example 1. The cushioning material may be sufficiently viscous that it does not penetrate the fabric during use.

Example 4

A wheelchair cushion of SEPS copolymer with mineral oil in a polyurethane flexible container may be formed as follows. A Styrene Ethylene Propylene Styrene (SEPS) triblock copolymer elastomer with a modified rubber midblock is selected having a melt mass-flow rate (MFR) from about 13 to about 25g/10 min at 230° C. with a 2.16 kg mass. The triblock copolymer has a density of about 0.900 g/cm$^3$ (as tested according to ASTM D792 (Standard Test Methods for Density and Specific Gravity (Relative Density) of Plastics by Displacement, ASTM Intl, West Conshohocken, Pa., 2000), a tensile strength at yield of about 10.3 MPa (1500 psi), and a tensile elongation at break of about 600% (the latter two as tested according to ASTM D412). For example, the SEPS copolymer may be KRATON® G1643M, available from Kraton Polymers, LLC. The white paraffinic mineral oil described in Example 1 is selected as the plasticizer. Four parts of the mineral oil are melt blended with one part of the SEPS triblock copolymer, and the resulting cushioning material is encased in a polyurethane flexible container in a wheelchair cushion base. The flexible container may provide a surface area in contact with the user that is larger than the contact surface provided by a conventional cushion of similar dimensions. The wheelchair cushion of Example 4 may have a higher softness compared to the wheelchair cushion of Example 1.

Example 5

A wheelchair cushion of styrene ethylene butylene styrene (SEBS) copolymer with mineral oil in a polyurethane flexible container may be formed as follows. A SEBS triblock copolymer elastomer with a modified rubber midblock is selected having a melt mass-flow rate (MFR) of about 2.0 to about 4.5g/10 min at 230° C. with a 2.16 kg mass. The triblock copolymer has a tensile strength at yield of about 10.3 MPa (1500 psi), and a tensile elongation at break of about 600% (as tested according to ASTM D412). The SEBS triblock copolymer may be compatible with polypropylene. For example, the SEBS triblock copolymer may be KRATON® MD6945M, also known as KRATON® G1645M, available from Kraton Polymers, LLC.

The white paraffinic mineral oil described in Example 1 is selected as the plasticizer. Four parts of the mineral oil are melt blended with one part of the SEBS triblock copolymer, and the resulting cushioning material is inserted into a polyurethane flexible container in a wheelchair cushion base. The flexible container may provide a surface area in contact with the user that is larger than a contact surface provided by a conventional cushion of similar dimensions. The flexible container may perform similarly to the flexible container of Example 1.

Example 6

A wheelchair cushion of styrene ethylene propylene (SEP) copolymer with mineral oil in a flexible container may be formed as follows. An A-B SEP diblock copolymer is selected having a melt mass-flow rate (MFR) of 0.1g/10 min, as tested according to ISO 1133 at 230° C. with a 2.16 kg mass. The diblock copolymer has a density of about 0.92 g/cm$^3$, a tensile strength at yield of about 2 MPa (290 psi), and a tensile elongation at break of less than 100% (the latter two as tested according to ISO 37). For example, the SEP diblock copolymer may be SEPTON® 1001, available from Kuraray America, Inc. The white paraffinic food-grade mineral oil (BLANDOL® White Mineral Oil) described in Example 1 is selected as the plasticizer. The mineral oil is added to the diblock copolymer in aliquots and melt-blended between aliquots until the resulting cushioning material exhibits similar properties to those exhibited by the cushioning material of Example 1. The cushioning material may be pumped into a flexible container for use in a wheelchair cushion, as in Example 1.

Example 7

A cushion of SEPS copolymer with mineral oil and microspheres may be formed as follows. An A-B-A triblock copolymer of SEPS is selected as described in Example 1. A white paraffinic mineral oil having a Saybolt Universal Second (SUS) kinematic viscosity of about 70 at 37.8° C. (e.g., CARNATION® White Mineral Oil, available from Sonneborn, Inc.) is selected as the plasticizer. Twenty parts of the mineral oil are melt blended with one part of the SEPS triblock copolymer within a heated stirring pot and then cooled. A liquid gel putty results, similar to a thickened fluid but with viscoelastic properties. Ultra-light hollow acrylic microspheres (EXPANCEL® 909 DET 80d15, available from Eka Chemicals AB, of Sundsvall, Sweden) with a density of 0.015 g/cm³ are selected as filler material. The acrylic microspheres are mixed into the gel putty in aliquots at room temperature and hand blended until smooth to reduce the density of the cushioning material to 0.26 g/cm³. A flat-welded thermoplastic polyurethane film flexible container is made from two layers of film that are each 0.0508 mm (0.002 in) thick. The flexible container is radio-frequency welded around the perimeter except for an entry hole with a neck, such that interior dimensions of the flexible container form a rectangle 152 mm (6 in) by 305 mm (12 in). The cushioning material is disposed in the flexible container, air is removed, and the neck entry hole is heat-sealed shut.

The cushion of Example 7 gel putty is compared to a conventional cushion comprising FLOAM™ (available from EdiZONE, LLC, of Alpine, Utah) having a density of 0.33 g/cm³ in a flexible container having the same configuration. This FLOAM™ includes oil-lubricated microspheres, wherein the oil includes 1% by weight high MW elastic A-B-A copolymer (KRATON® G1651H, available from Kraton Polymers, LLC) to attract the oil molecules and help prevent the oil from leaching through the flexible container over time. The cushioning material of Example 7 is 21% less dense than the FLOAM™ even though it has the same overall resistance to deformation as the FLOAM™. Furthermore, the cushioning material of Example 7 conforms more fully around a protrusion of a cushioned object or body part under a given cushioning force than does the FLOAM™.

Example 8

A cushion of SEPS copolymer with mineral oil and microspheres may be formed as follows. An A-B-A triblock copolymer of SEPS (SEPTON® 2002) and a white paraffinic mineral oil having a Saybolt Universal Second (SUS) kinematic viscosity of about 70 at 37.8° C. (e.g., CARNATION® White Mineral Oil) are selected as described in Example 7. Twenty parts of the mineral oil are melt blended with one part of the SEPS triblock copolymer within a heated stirring pot and then cooled to form a low-bodied (flowable) gel putty. Ultra-light hollow acrylic microspheres (EXPANCEL® 909 DET 80d15) are mixed into the gel putty in aliquots at room temperature and hand blended until smooth to reduce the specific gravity of the resulting cushioning material to 0.33. A flat-welded thermoplastic polyurethane flexible container is made as described in Example 7. The cushioning material is disposed in the flexible container, air is removed, and the neck entry hole is heat-sealed shut.

The cushioning material has viscoelastic properties, such that the flexible container can be molded and sculpted to shape, yet the force of gravity causes the flexible container to flatten back out. In other words, the cushioning material of Example 8 is flowable under its own weight when it partially fills a flat rectangular flexible container of dimensions 152 mm (6 in) by 305 mm (12 in).

Example 9

A doll filled with SEPS copolymer with mineral oil may be formed as follows. An A-B-A triblock SEPS copolymer (SEPTON® 2002, available from Kuraray America, Inc.) is combined with a white paraffinic mineral oil having a Saybolt Universal Second (SUS) kinematic viscosity of about 70 at 37.8° C. (e.g., CARNATION® White Mineral Oil, available from Sonneborn, Inc.). 10 parts by weight of the mineral oil is melt blended with 3 parts by weight of the SEPS triblock copolymer in an extruder. The resulting cushioning material is pumped into a doll skin. The doll skin may be formed of a gelatinous elastomer, for example, by combining three parts of the white paraffinic mineral oil with one part of a Styrene Ethylene Ethylene Propylene Styrene (SEEPS) material (for example, SEPTON® 4055, available from Kuraray America, Inc.). The gel putty mixture is allowed to cool within the doll skin, forming a high-bodied (stout) gel putty.

The arms or legs of the doll may be stretched to several times their original length. The gel putty within the doll of this example may pop and rip apart, simulating to a child playing with the toy that the muscles of the doll are ripping apart. When the child releases the arms or legs, the gel putty can be observed to be broken apart into pieces with irregular shapes beneath the doll skin. As the elastic skin of the doll slowly brings the gel putty back together, the gel putty heals and over time becomes again one integrated piece of gel putty, ready for the child to pull on that limb again and pop or rip the "muscles" during play.

Example 10

A chair cushion of SEPS copolymer with mineral oil and antioxidant may be formed as follows. An A-B-A triblock SEPS copolymer (SEPTON® 2002, available from Kuraray America, Inc.) is combined with a white paraffinic mineral oil having a Saybolt Universal Second (SUS) kinematic viscosity of about 70 at 37.8° C. (e.g., CARNATION® White Mineral Oil, available from Sonneborn, Inc.). Four parts by weight of the white paraffinic mineral oil are melt blended with one part of the SEPS triblock copolymer and 0.01 parts of pentaerythritol tetrakis(3-(3,5-di-tert-butyl-4-hydroxyphenyl)propionate) antioxidant (IRGANOX® 1010, available from BASF Corp., of Iselin, N.J.). The resulting cushioning material is pumped into a flexible container made of thermoplastic polyurethane film having a thickness of 0.254 mm (0.010 in), and cooled to room temperature. The flexible container is filled to approximately 50% of its maximum capacity, and excess air is removed before the flexible container is sealed. The flexible container is placed into a base made of polyurethane cushioning foam, having a density of 0.029 g/cm³ (1.8 lb/ft³) and an Indentation Load Deflection (ILD) firmness of 36. The base is shaped to accommodate the seat of an office chair. The base is covered with durable fabric and installed on the office chair.

When a user sits on the office chair, his or her weight causes the fabric, the flexible container, and the cushioning material within the flexible container to deform. Because the fabric and the flexible container are pliable, and because the cushioning material has its characteristic forming ability, the seat of the office chair conforms to the shape of the user's body. The user is thus able to sit comfortably for longer periods than with a conventional covered-foam office chair seat cushion, and is more comfortable from the beginning of his or her sitting experience. Alternatively, the flexible container with a cushioning material of this example may be used in an aftermarket seat cushion to be placed on top of an office chair's existing cushion, the seat of a car, a dining chair, or any other existing seating surface. Because the polyurethane film is essentially waterproof, such flexible containers can be effectively used outdoors, where rain and snow are a problem, such as on patio chairs or football stadium bleachers.

Example 11

A chair cushion of SEPS copolymer with mineral oil, antioxidant, and filler may be formed as follows. As described in Example 10, four parts by weight of the white paraffinic mineral oil are melt-blended with one part of the SEPS triblock copolymer and 0.01 parts of pentaerythritol tetrakis(3-(3,5-di-tert-butyl-4-hydroxyphenyl)propionate) antioxidant. A particulate filler of any type as described herein may be added to the melt blend before pumping it into the flexible container.

Example 12

A shoe cushion of SEPS copolymer with mineral oil and antioxidant and optional filler may be formed as follows. An A-B-A triblock copolymer of SEPS (SEPTON® 2002, available from Kuraray America, Inc.) and a white paraffinic mineral oil having a Saybolt Universal Second (SUS) kinematic viscosity of about 70 at 37.8° C. (e.g., CARNATION® White Mineral Oil, available from Sonneborn, Inc.) are selected as described in Example 2. Pentaerythritol tetrakis(3-(3,5-di-tert-butyl-4-hydroxyphenyl)propionate) (IRGANOX® 1010, available from BASF Corp., of Iselin, N.J.) is selected as an antioxidant. Two parts by weight of the mineral oil are melt blended with one part of the SEPS triblock elastomeric copolymer and 0.01 parts of the antioxidant. The resulting mixture is pumped into a flexible container made of thermoplastic polyurethane film having a thickness of 0.254 mm (0.010 in), and cooled to room temperature to form a conformable but very supportive or stout gel putty. The flexible container is shaped to accommodate being placed within a shoe beneath a user's foot or sock. The top layer of the flexible container is made with knit fabric laminated to thin thermoplastic polyurethane film, with the fabric side configured to be disposed adjacent the user's foot. The bottom layer of the flexible container (beneath the gel putty) is thermoplastic polyurethane film. The flexible container is filled to a low level (e.g., 5% to 10% of the flexible container's maximum capacity) so that the flexible container remains relatively flat, with the peak thickness of the flexible container being 3.175 mm (0.125 in). Any excess air is removed before the flexible container is sealed shut. When a user walks in a shoe with the flexible container between his sock and the shoe's sole, the cushioning material deforms to meet and support his arch and tends toward equalization of pressure on the entire foot. Even if pressure is not fully equalized, the flexible container may still reduce peak pressures. Because a low concentration of plasticizer is used, the gel putty material may be very supportive; once the gel putty is shaped to fit the arch, it does not flow far with each step, stays largely in shape, and provides arch support. The cushioning material, though flowable in response to enough pressure and time under pressure, is also elastic in response to short-duration loads or shocks. The cushioning material may therefore provide better shock absorption to the user's foot than conventional cushioning materials. The user may thus be able to stand or walk comfortably for longer periods than without the cushion. The cushioning material of Example 12 may also contain particulate fillers, as described in Example 11.

Example 13

A bicycle seat cushion of SEPS copolymer with mineral oil and antioxidant may be formed as follows. An A-B-A triblock copolymer of SEPS (SEPTON® 2002, available from Kuraray America, Inc.) and a white paraffinic mineral oil having a Saybolt Universal Second (SUS) kinematic viscosity of about 70 at 37.8° C. (e.g., CARNATION® White Mineral Oil, available from Sonneborn, Inc.) are selected as described in Example 2. Pentaerythritol tetrakis(3-(3,5-di-tert-butyl-4-hydroxyphenyl)propionate) (IRGANOX® 1010, available from BASF Corp., of Iselin, N.J.) is selected as an antioxidant. Three parts by weight of the mineral oil are melt blended with one part of the SEPS triblock elastomeric copolymer and 0.01 parts of the antioxidant. The resulting mixture is pumped into a flexible container made of thermoplastic polyurethane film having a thickness of 0.254 mm (0.010 in), and cooled to room temperature to form a conformable but very supportive or stout gel putty. The flexible container is shaped to accommodate being placed within a bicycle seat. The increased plasticizer level allows somewhat quicker conformation than the material in Example 12, so that the bicycle rider's posterior, which does not require arch support like the insole material of Example 12, can more freely reshape the flexible container with each stroke of the pedal and associated movements of the rider's posterior. Nonetheless, even a ratio of three parts plasticizer to one part polymer produces a reasonably stout gel putty, providing a communication-by-feel between the user and the seat cushion that bicyclists may demand.

Example 14

Athletic pads of SEPS copolymer with mineral oil, antioxidant, and filler may be formed as follows. An A-B-A triblock copolymer of SEPS (SEPTON® 2002, available from Kuraray America, Inc.) and a white paraffinic mineral oil having an average MW of about 70 g/mol (CARNATION® White Mineral Oil, available from Sonneborn, Inc.) are selected as described in Example 2. Pentaerythritol tetrakis(3-(3,5-di-tert-butyl-4-hydroxyphenyl)propionate) (IRGANOX® 1010, available from BASF Corp., of Iselin, N.J.) is selected as an antioxidant.

Five parts by weight of the mineral oil are melt blended with four parts of the SEPS triblock copolymer and 0.2 parts of the antioxidant in an extruder. A sufficient amount of hollow acrylic microspheres (EXPANCEL® 909 DET 80d15, available from Eka Chemicals AB) is added to decrease the density of the material to 0.18 g/cm$^3$ (11.2 lb/ft$^3$). The melt blend is extruded through a sheet die, such that the extruded sheet has a thickness of 5.08 mm (0.2 in). Stretchable fabric is placed on the top of and beneath the extruded sheet, and is stitched, sewn, or quilted to the sheet. The fabric is unlaminated and uncoated. In addition to decreasing the density of the gel putty, the microspheres give the melted material more body to help keep the extruded sheet in shape during the fabric placement and quilting. The material is placed in athletic clothing or in athletic impact pads, providing cushioning to protect an athlete from collisions with objects or people.

Example 15

Athletic pads of SEPS copolymer with mineral oil, antioxidant, and filler may be formed as follows. An extruded sheet of gel putty is formed as described in Example 14. Stretchable fabric with a layer of thin plastic laminated to one side is placed on top of and beneath the extruded sheet. The material is stitched, sewn, or quilted together, with the thin plastic in contact with the extruded gel putty sheet. The material is placed in athletic clothing or in athletic impact pads.

Example 16

A ball of SEPS copolymer with mineral oil may be formed as follows. A cushioning material is formed from an A-B-A triblock SEPS copolymer and a white paraffinic mineral oil as described in Example 9. The cushioning material is placed into a stretchable or pliable spherical ball skin, air is removed, and the ball skin is sealed to form a ball. The ball may be sold as a hand exerciser or as a novelty. The popping and ripping of the gel putty may create a fun and uniquely tactile feel that encourages continuing exercise or delights the novelty user.

Example 17

A personal flotation device of SEPS copolymer with mineral oil, antioxidant, and filler may be formed as follows. An extruded sheet of gel putty is formed as described in Example 14. Multiple flexible containers partially filled with gel putty are placed within pockets of a sewn garment shaped as a personal flotation device (PFD) (e.g., a vest). The gel putty may have density low enough to improve flotation of a user (e.g., from about 0.1 g/cm$^3$ to about 0.7 g/cm$^3$, or from about 0.2 g/cm$^3$ to about 0.4 g/cm$^3$). The formability of the gel putty may increase comfort for the user compared with previously known PFDs, which may encourage use of the PFD.

Additional non-limiting example embodiments of the disclosure are described below.

Embodiment 1

A healable gel putty material, comprising: an elastomeric polymer having a melt mass-flow rate in a range extending from about 2 g/10 min to about 100 g/10 min; and a plasticizer mixed with the elastomeric polymer to form the healable gel putty material; wherein a ratio of the plasticizer to the elastomeric polymer by weight is in a range extending from about 1-to-1 to about 50-to-1.

Embodiment 2

The healable gel putty material of Embodiment 1, wherein the elastomeric polymer comprises a block copolymer having a styrene content in a range extending from about 10% to about 70% by weight.

Embodiment 3

The healable gel putty material of Embodiment 2, wherein the block copolymer is a triblock copolymer selected from the group consisting of styrene ethylene propylene styrene (SEPS), styrene ethylene butylene styrene (SEBS), and styrene ethylene ethylene propylene styrene (SEEPS).

Embodiment 4

The healable gel putty material of any one of Embodiments 1 through 3, wherein the plasticizer comprises an oil.

Embodiment 5

The healable gel putty material of Embodiment 4, wherein the plasticizer comprises an aromatic or aliphatic mineral oil.

Embodiment 6

The healable gel putty material of Embodiment 4, wherein the plasticizer comprises aromatic-free white paraffinic mineral oil.

Embodiment 7

The healable gel putty material of any one of Embodiments 1 through 6, wherein the elastomeric polymer comprises a material having a tensile strength at yield from about 5 MPa to about 20 MPa.

Embodiment 8

The healable gel putty material of any one of Embodiments 1 through 7, wherein the ratio of the plasticizer to the elastomeric polymer by weight is about 30-to-1 or less.

Embodiment 9

The healable gel putty material of Embodiment 8, wherein the ratio of the plasticizer to the elastomeric polymer by weight is in a range extending from about 15-to-1 to about 25-to-1.

Embodiment 10

The healable gel putty material of any one of Embodiments 1 through 9, wherein the gel putty comprises a liquid gel putty.

Embodiment 11

The healable gel putty material of any one of Embodiments 1 through 10, wherein the ratio of the plasticizer to the elastomeric polymer by weight is about 20-to-1.

Embodiment 12

The healable gel putty material of Embodiment 8, wherein the ratio of the plasticizer to the elastomeric polymer by weight is about 7-to-1 or less.

Embodiment 13

The healable gel putty material of any one of Embodiments 1 through 9, 11, and 12, wherein the gel putty comprises a solid gel putty.

Embodiment 14

An article of manufacture, comprising: a flexible container; and a material comprising gel putty as recited in any one of Embodiments 1 through 13 disposed within the flexible container.

Embodiment 15

The article of manufacture of Embodiment 14, wherein the material further comprises a filler having a density of less than about 0.2 g/cm$^3$.

Embodiment 16

The article of manufacture of Embodiment 15, wherein the filler comprises one or more of talc, silica, microspheres, and pearlite.

Embodiment 17

The article of manufacture of any one of Embodiments 14 through 16, wherein the material has a density of about 0.35 g/cm$^3$ or lower.

Embodiment 18

The article of manufacture of any one of Embodiments 14 through 17, wherein the material has a density of about 0.21 g/cm³ or lower.

Embodiment 19

The article of manufacture of any one of Embodiments 14 through 18, wherein the flexible container comprises a polymer material.

Embodiment 20

The article of manufacture of any one of Embodiments 14 through 19, wherein the flexible container has an average thickness of from about 0.051 mm (0.002 in) to about 6.35 mm (0.250 in).

Embodiment 21

The article of manufacture of any one of Embodiments 14 through 18, wherein the flexible container comprises a fabric.

Embodiment 22

The article of manufacture of any one of Embodiments 14 through 18, wherein the material comprises a sheet of material, and wherein the flexible container comprises a sheet of flexible fabric.

Embodiment 23

The article of manufacture of any one of Embodiments 14 through 22, wherein the article of manufacture comprises a cushion.

Embodiment 24

The article of manufacture of any one of Embodiments 14 through 22, wherein the article of manufacture comprises a toy.

Embodiment 25

A method of forming gel putty, comprising: mixing a plasticizer and an elastomeric polymer to form a mixture; selecting the elastomeric polymer to comprise an elastomeric polymer having a melt mass-flow rate in a range extending from about 2 g/10 min to about 100 g/10 min; and formulating a ratio of the plasticizer to the elastomeric polymer by weight in the mixture to be in a range extending from about 1-to-1 to about 50-to-1.

Embodiment 26

The method of Embodiment 25, further comprising selecting the elastomeric polymer to comprise a block copolymer having a styrene content in a range extending from about 10% to about 70% by weight.

Embodiment 27

The method of Embodiment 26, further comprising selecting the elastomeric polymer to comprise a triblock copolymer selected from the group consisting of styrene ethylene propylene styrene (SEPS), styrene ethylene butylene styrene (SEBS), and styrene ethylene ethylene propylene styrene (SEEPS).

Embodiment 28

The method of any one of Embodiments 25 through 27, further comprising mixing the plasticizer and the elastomeric polymer in a heated stirring pot.

Embodiment 29

The method of any one of Embodiments 25 through 27, further comprising mixing the plasticizer and the elastomeric polymer using a heated extrusion screw.

Embodiment 30

The method of any one of Embodiments 25 through 29, further comprising formulating the ratio of the plasticizer to the elastomeric polymer by weight in the mixture to be about 30-to-1 or less.

Embodiment 31

The method of Embodiment 30, further comprising formulating the ratio of the plasticizer to the elastomeric polymer by weight in the mixture to be in a range extending from about 15-to-1 to about 25-to-1.

Embodiment 32

The method of any one of Embodiments 25 through 31, further comprising formulating the gel putty to comprise a liquid gel putty.

Embodiment 33

The method of any one of Embodiments 25 through 32, further comprising formulating the ratio of the plasticizer to the elastomeric polymer by weight in the mixture to be about 20-to-1.

Embodiment 34

The method of any one of Embodiments 25 through 30, further comprising formulating the ratio of the plasticizer to the elastomeric polymer by weight in the mixture to be about 7-to-1 or less.

Embodiment 35

The method of any one of Embodiments 25 through 30 and 34, further comprising formulating the gel putty to comprise a solid gel putty.

Embodiment 36

A method of forming an article of manufacture, comprising disposing a gel putty as recited in any one of Embodiments 1 through 13 within a flexible container.

Embodiment 37

The method of Embodiment 36, further comprising forming the article of manufacture to comprise a cushion.

Embodiment 38

The method of Embodiment 36, further comprising forming the article of manufacture to comprise a toy.

Embodiment 39

The method of any one of Embodiments 36 through 38, further comprising forming the gel putty as recited in any one of Embodiments 25 through 35.

Embodiments of the disclosure may be susceptible to various modifications and alternative forms. Specific embodiments have been shown in the drawings and described in detail herein to provide illustrative examples of embodiments of the disclosure. However, the disclosure is not limited to the particular forms disclosed herein. Rather, embodiments of the disclosure may include all modifications, equivalents, and alternatives falling within the scope of the disclosure as broadly defined herein. Furthermore, elements and features described herein in relation to some embodiments may be implemented in other embodiments of the disclosure, and may be combined with elements and features described herein in relation to other embodiments to provide yet further embodiments of the disclosure.

What is claimed is:

1. A healable gel putty material, comprising:
an elastomeric polymer having a melt mass-flow rate in a range extending from about 2 g/10 min to about 100 g/10 min; and
a plasticizer mixed with the elastomeric polymer to form the healable gel putty material;
wherein a ratio of the plasticizer to the elastomeric polymer by weight is in a range extending from about 1-to-1 to about 50-to-1;
wherein the healable gel putty material is formulated to be parted and rejoined, wherein rejoining of the healable gel putty material comprises obscuring a boundary between portions of the healable gel putty material.

2. The healable gel putty material of claim 1, wherein the elastomeric polymer comprises a block copolymer having a styrene content in a range extending from about 10% to about 70% by weight.

3. The healable gel putty material of claim 2, wherein the block copolymer is a triblock copolymer selected from the group consisting of styrene ethylene propylene styrene (SEPS), styrene ethylene butylene styrene (SEBS), and styrene ethylene ethylene propylene styrene (SEEPS).

4. The healable gel putty material of claim 1, wherein the plasticizer comprises an oil.

5. The healable gel putty material of claim 4, wherein the plasticizer comprises an aromatic or aliphatic mineral oil.

6. The healable gel putty material of claim 4, wherein the plasticizer comprises aromatic-free white paraffinic mineral oil.

7. The healable gel putty material of claim 1, wherein the elastomeric polymer comprises a material having a tensile strength at yield from about 5 MPa to about 20 MPa.

8. The healable gel putty material of claim 1, wherein the ratio of the plasticizer to the elastomeric polymer by weight is about 30-to-1 or less.

9. The healable gel putty material of claim 8, wherein the ratio of the plasticizer to the elastomeric polymer by weight is in a range extending from about 15-to-1 to about 25-to-1.

10. The healable gel putty material of claim 9, wherein the gel putty comprises a liquid gel putty.

11. The healable gel putty material of claim 10, wherein the ratio of the plasticizer to the elastomeric polymer by weight is about 20-to-1.

12. The healable gel putty material of claim 8, wherein the ratio of the plasticizer to the elastomeric polymer by weight is about 7-to-1 or less.

13. The healable gel putty material of claim 12, wherein the gel putty comprises a solid gel putty.

14. An article of manufacture, comprising:
a flexible container; and
a material comprising healable gel putty material disposed within the flexible container, the healable gel putty material comprising:
an elastomeric polymer having a melt mass-flow rate in a range extending from about 2 g/10 min to about 100 g/10 min; and
a plasticizer mixed with the elastomeric polymer;
wherein a ratio of the plasticizer to the elastomeric polymer by weight is in a range extending from about 1-to-1 to about 50-to-1;
wherein the healable gel putty material is formulated to be parted and rejoined, wherein rejoining of the healable gel putty material comprises obscuring a boundary between portions of the healable gel putty material.

15. The article of manufacture of claim 14, wherein the elastomeric polymer comprises a triblock copolymer selected from the group consisting of styrene ethylene propylene styrene (SEPS), styrene ethylene butylene styrene (SEBS), and styrene ethylene ethylene propylene styrene (SEEPS).

16. The article of manufacture of claim 14, wherein the material further comprises a filler having a density of less than about 0.2 g/cm$^3$.

17. The article of manufacture of claim 16, wherein the filler comprises one or more of talc, silica, microspheres, and pearlite.

18. The article of manufacture of claim 14, wherein the material has a density of about 0.35 g/cm$^3$ or lower.

19. The article of manufacture of claim 18, wherein the material has a density of about 0.21 g/cm$^3$ or lower.

20. The article of manufacture of claim 14, wherein the flexible container comprises a polymer material.

21. The article of manufacture of claim 20, wherein the flexible container has an average thickness of from about 0.051 mm (0.002 in) to about 6.35 mm (0.250 in).

22. The article of manufacture of claim 14, wherein the flexible container comprises a fabric.

23. The article of manufacture of claim 14, wherein the material comprises a sheet of material, and wherein the flexible container comprises a sheet of flexible fabric.

24. The article of manufacture of claim 14, wherein the ratio of the plasticizer to the elastomeric polymer by weight is about 30-to-1 or less.

25. The article of manufacture of claim 14, wherein the ratio of the plasticizer to the elastomeric polymer by weight is in a range extending from about 15-to-1 to about 25-to-1.

26. The article of manufacture of claim 25, wherein the gel putty comprises a liquid gel putty.

27. The article of manufacture of claim 26, wherein the ratio of the plasticizer to the elastomeric polymer by weight is about 20-to-1.

28. The article of manufacture of claim 14, wherein the article of manufacture comprises a cushion.

29. The article of manufacture of claim 14, wherein the article of manufacture comprises a toy.

30. A method of forming a healable gel putty material, the method comprising:

mixing a plasticizer and an elastomeric polymer to form a mixture;

wherein the elastomeric polymer comprises an elastomeric polymer having a melt mass-flow rate in a range extending from about 2 g/10 min to about 100 g/10 min; and wherein a ratio of the plasticizer to the elastomeric polymer by weight in the mixture is in a range extending from about 1-to-1 to about 50-to-1;

wherein the healable gel putty material is formulated to be parted and rejoined, wherein rejoining of the healable gel putty material comprises obscuring a boundary between portions of the healable gel putty material.

31. The method of claim 30, wherein the elastomeric polymer comprises a block copolymer having a styrene content in a range extending from about 10% to about 70% by weight.

32. The method of claim 30, wherein the elastomeric polymer comprises a triblock copolymer selected from the group consisting of styrene ethylene propylene styrene (SEPS), styrene ethylene butylene styrene (SEBS), and styrene ethylene ethylene propylene styrene (SEEPS).

33. The method of claim 30, further comprising mixing the plasticizer and the elastomeric polymer in a heated stirring pot.

34. The method of claim 30, further comprising mixing the plasticizer and the elastomeric polymer using a heated extrusion screw.

35. The method of claim 30, wherein the ratio of the plasticizer to the elastomeric polymer by weight in the mixture is about 30-to-1 or less.

36. The method of claim 35, wherein the ratio of the plasticizer to the elastomeric polymer by weight in the mixture is in a range extending from about 15-to-1 to about 25-to-1.

37. The method of claim 36, wherein mixing a plasticizer and an elastomeric polymer to form a mixture comprises forming a liquid gel putty.

38. The method of claim 37, wherein the ratio of the plasticizer to the elastomeric polymer by weight in the mixture is about 20-to-1.

39. The method of claim 35, wherein the ratio of the plasticizer to the elastomeric polymer by weight in the mixture is about 7-to-1 or less.

40. The method of claim 39, wherein mixing a plasticizer and an elastomeric polymer to form a mixture comprises forming a solid gel putty.

41. A method of forming an article of manufacture, comprising:

forming healable gel putty material, the forming comprising:

mixing a plasticizer and an elastomeric polymer to form a mixture;

wherein the elastomeric polymer comprises an elastomeric polymer having a melt mass-flow rate in a range extending from about 2 g/10 min to about 100 g/10 min; and wherein a ratio of the plasticizer to the elastomeric polymer by weight in the mixture is in a range extending from about 1-to-1 to about 50-to-1;

wherein the healable gel putty material is formulated to be parted and rejoined, wherein rejoining of the healable gel putty material comprises obscuring a boundary between portions of the healable gel putty material; and disposing the healable gel putty material within a flexible container.

42. The method of claim 41, further comprising forming the article of manufacture to comprise a cushion.

43. The method of claim 41, further comprising forming the article of manufacture to comprise a toy.

* * * * *